Patented Feb. 5, 1929.

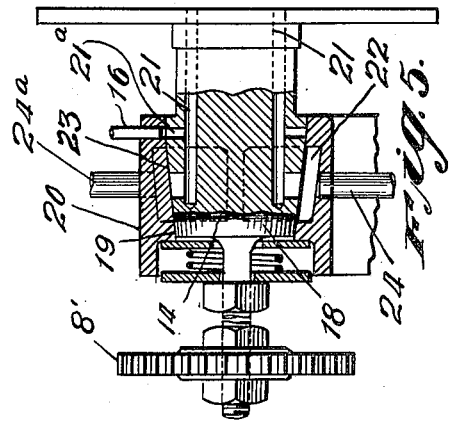
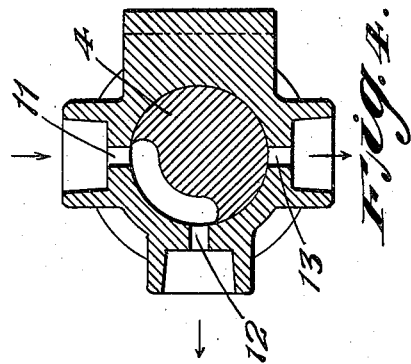
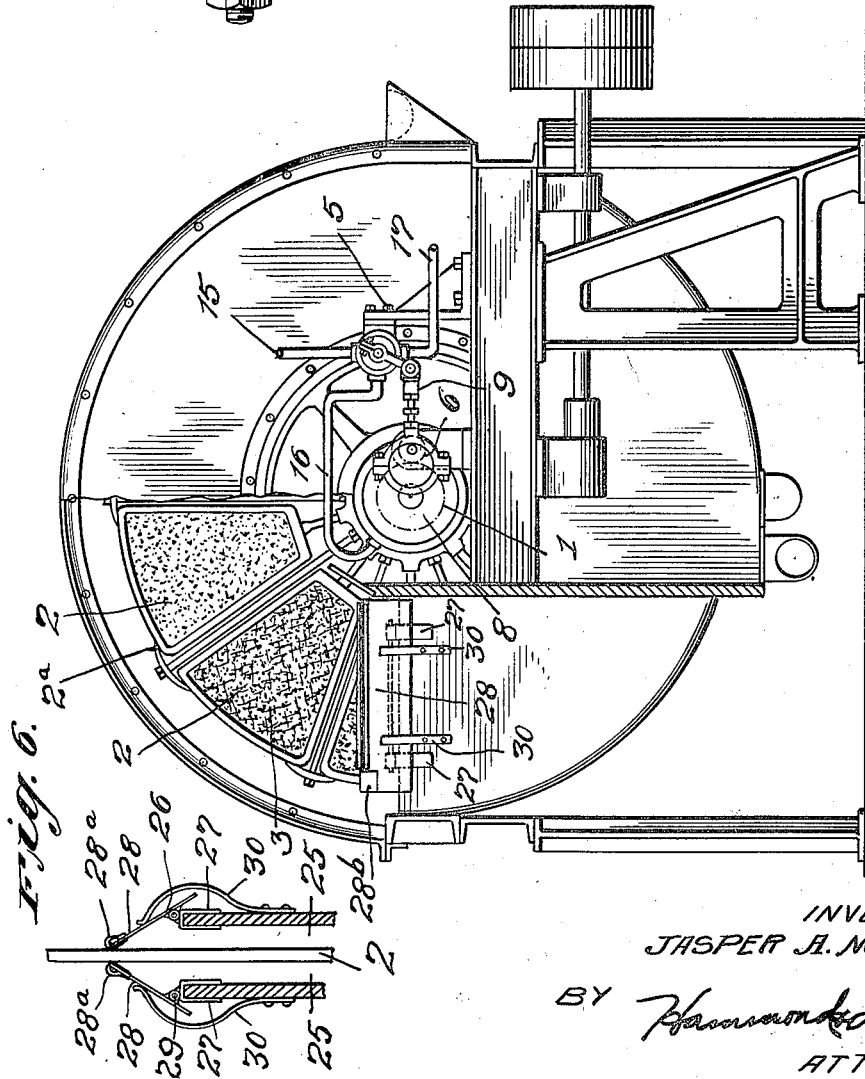

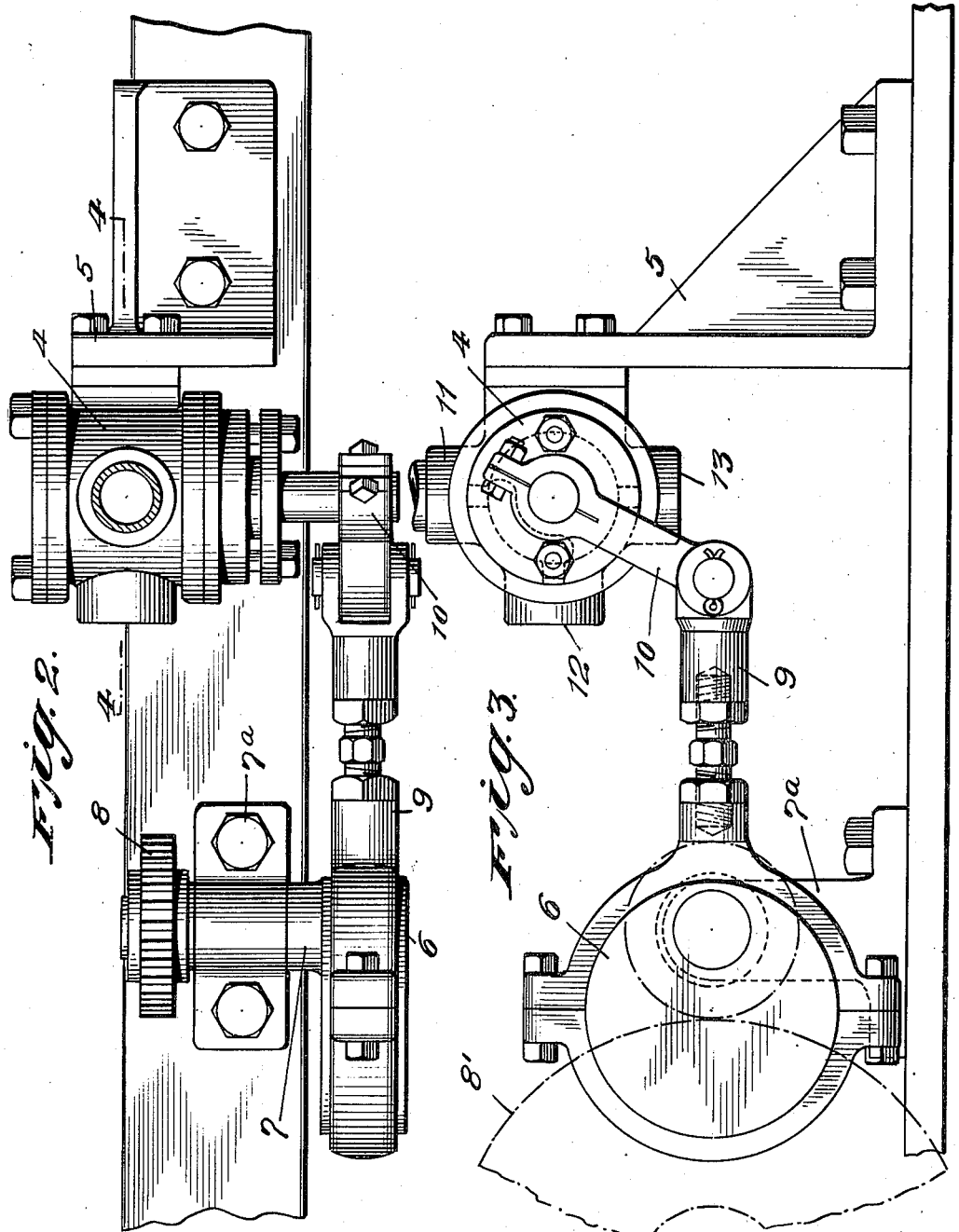

1,700,772

UNITED STATES PATENT OFFICE.

JASPER A. McCASKELL, OF SALT LAKE CITY, UTAH.

FILTER-CAKE-DISCHARGING APPARATUS.

Application filed September 19, 1925. Serial No. 57,295.

My invention relates to filtering apparatus, and particularly to a rotary filter of either the pressure or the suction type. The invention has for a principal object the provision of means for removing the cake of solid material which forms on the filter leaves in an expeditious and simple manner. Other objects will appear as the description proceeds.

According to the preferred embodiment of the invention the cake is removed from the filter leaves by causing intermittent inflation and deflation of the leaves as they come into position for discharge of the cake which has collected upon their surfaces. This is accomplished by connecting the passages within the filter leaf first with a source of fluid under high pressure and then with a vacuum line in the case of a suction filter and in use with a pressure filter to only use the pressure fluid on the interior of the leaf, the filter pressure on the outside of the leaf being sufficient to cause deflation of the bags and repeating these operations repeatedly so as to produce pulsations of the fabric forming the filter leaf.

In the accompanying drawings forming part of this specification and in which similar letters of reference indicate like parts in the several views;

Figure 1 is an end elevation partly in section of a rotary continuous filter to which is applied an oscillating valve mechanism embodying the present invention.

Figure 2 is a top plan view of the oscillating valve and the operating mechanism therefor.

Figure 3 is a side elevation of the structure shown in Figure 2.

Figure 4 is a cross-sectional view through the valve shown in Figure 2 on the line 4—4.

Figure 5 is a part sectional view of the valve mechanism customarily applied to the end of the central shaft of rotary suction filters of this type and which cooperates with the valve of the present invention.

Figure 6 is a detail view partly in section showing means for preventing the cake material as it is loosened from the leaf from falling back into the filter tank.

The filter 1, which may be of the pressure type shown in my prior Patent No. 1,266,133, or of the suction type shown in the patent to Orange J. Salisbury, No. 1,259,139, comprises a central rotary shaft having secured thereon a series of filter leaves 2 of disk-like form, said leaves having their lower portions adapted to rotate in a tank containing the solution to be filtered. Each filter leaf is made up of a number of sections and the sides of each section are composed of some suitable filtering fabric 3 beneath which is placed a backing or drainage member of woven wire or other foraminous material for holding the fabric sides apart and forming an interior chamber through which the filtrate is forced by suction or pressure into the central shaft. The filtrate passes into the shaft and through certain passages formed therein and is finally discharged at a point outside the tank. The solids present in the solution accumulate on the outside of the filter leaves as they rotate through the solution, and, according to the practice heretofore followed, are removed by suitable scraping agencies and conducted to a desired place outside of the tank.

According to the present invention, instead of providing means for scraping the solid material from the surfaces of the filter leaves, oscillating value means are provided for causing variations in the fluid pressure within the filter leaves and to thereby cause the fabric of the filter leaves to pulsate with consequent loosening of the solid material accumulated thereon. In addition to means for loosening the material, means are also provided for deflecting the loosened material away from the surfaces of the filter leaf and to prevent the material from falling back into the solution tank. In this way the solid material is more completely removed from the filter leaves than is possible with the means heretofore employed.

The oscillating valve 4 is secured to the end frame of the filter by suitable supporting means 5. Six is an eccentric which is operated by a jackshaft 7, supported in bearings 7a on the filter frame and driven from the central shaft by means of suitable gearing 8, 8'. An adjustable connecting rod 9 extends between the eccentric and the lever arm 10 of the valve 4. The valve 4 is provided with ports 11, 12 and 13 adapted, respectively, to connect with a source of high pressure air, to connect with the interior of the filter leaf through the central shaft and the rotating valve 14, hereinafter described, and to connect with the vacuum line in a suction filter such as that shown in the drawing or with the atmosphere in case the invention is applied to a pressure filter. A pipe 15 connects the port 11 with a source of high pressure air not shown, a pipe 16 is shown as connecting the port 12 with the rotating valve 14, and the pipe 17 connects the port 13 with a vacuum line not shown.

The valve 14 of the suction filter is in the form of a turning-plug and has a tapered surface 18 designed to engage a corresponding tapered seat 19 formed in the valve casing 20 alined with the central shaft and fixedly held relatively thereto. The valve is provided with an annular row of longitudinally extending passages 21, each cooperating with a corresponding passage (not shown) in the central shaft, which passages communicate with the interior of the filter leaves. The space between the valve and the valve casing is divided into two chambers 22 and 23 connected respectively with the filtrate discharge pipes 24 and 24$^a$, and the pipe 16 leading to the valve 4 is connected through a by-pass 21$^a$ with the passages 21 at a point where the passages 21 do not communicate with the suction line. As is understood by those skilled in the art, the respective passages in the central shaft are connected with the alined rows of sections of the filter leaves mounted on the shaft, so that as the shaft and the valve 14 connected therewith revolve, the valve chamber 22 will be connected with the portion of the filter leaves which is immersed in the solution in the tank while the valve chamber 23 will be connected with the portion of the filter leaves which are at the moment out of the solution, and the pipe 16 with the portion of the filter leaves in a position for discharge of the cakes of solid material thereon.

In operation suction is applied through the pipe 24, the filtrate is thereby drawn into the interior of the filter leaves immersed therein and then through the passages connected therewith and out through the valve chamber 22. At the same time quick puffs or pulsations of air under pressure, alternated with suction from a vacuum line, is caused to flow through the pipe 16 into the passages 21 and then into the interior of those filter leaves which are in a position to discharge the filter cake. This causes the fabric of the filter leaves to bend in and out with rapid pulsations and thus loosen the caked solid material.

In order to prevent the cake from dropping back into the solution suitable deflecting means is provided at the entrance of the leaves into the solution tanks. For convenience this means will be referred to hereinafter as a scraper, but it is to be understood that in operation it functions in a markedly different manner from the scraping means heretofore employed. As shown in the drawing, the solution tank on one side of the central shaft is provided with pockets 25 within which the filter leaves move, while between these pockets are passages through which the solid material may pass when it is loosened from the filter leaves. Scrapers 26 are attached to the edges of these pockets on each side of each filter leaf by means of clips 27. Each scraper consists of a flat metal plate 28 to one edge of which is attached a soft rubber strip 28$^a$. The scraper is hinged at 29 to the clips 26 and is provided with a flat spring 30. Under the pressure of the spring the scraper will be kept in contact with the filter leaf and thus prevent any of the loosened solid material from falling back into the solution, at the same time lifting any cake from the filter leaves which, though loosened, has not been discharged. The edges of the scrapers 28 contact with the shoe 2$^a$ which runs around the periphery of the disks so that the scraper barely touches the filter cloth but effectually seals the entrance to the solution and prevents the dislodged cake from falling thereinto. To prevent unnecessary wear on the scrapers, they may be provided with a metal wear plate 28$^b$ for contacting with the shoe 2$^a$.

It is to be understood that the ratio of the gearing connecting the oscillating valve with the central shaft may be changed to produce any desired rate of pulsations according to the character of the material being treated. I have operated successfully at 60 pulsations per minute, although a higher rate or a rate as low as 20 per minute may be used. The lowest rate which will remove the cake is to be desired, because this results in a minimum loss of pressure or vacuum in the system.

It has been proposed heretofore to inflate the filter leaf and maintain it in an inflated condition while the cake is being scraped off. However, the present invention is to be distinguished therefrom since not only is the scraping action with the attendant wear on the filter fabric dispensed with, but the pulsating movement given to the filter leaf causes the fabric to bend in and out and thus clean the pores of the fabric more thoroughly without mechanical contact with a cake remover. This bending back and forth of the cloth is a decided advantage in filtering materials which tend to smear and clog the pores of the filter when scrapers are used.

While the invention has been described in connection with pressure or vacuum filters of the rotating leaf type, it is to be understood that it is likewise applicable to the drum type filter and other continuous filters, and that various modifications and changes may be made in the embodiments of the invention illustrated without departing from the spirit of the invention or the scope of the appended claims.

I claim:

1. In a filtering apparatus, a filter agent having a plurality of flexible walls, means for inducing flow of the material being filtered through said walls, means for bringing said filter agent to a discharge position out of contact with said material, and means for producing pulsations in said walls while the filter agent is in such discharge position.

2. In a continuous filter, a filter agent arranged to dip periodically into and to rise from the material being filtered and means for producing a rapid back and forth bending movement of the surfaces of the filter agent during a portion of its travel when it is out of the material being filtered.

3. In a filtering apparatus, a hollow rotatable shaft, filter leaves mounted on said shaft, said leaves being formed in sections each having its interior connecting with a passage in the shaft, and means to produce rapid intermittent inflation and deflation of the filter leaf sections at a predetermined position in their rotation.

4. In a filtering apparatus, a hollow rotatable shaft, inflatable filter leaves mounted on said shaft, said leaves being formed in sections each having its interior connecting with a passage in the shaft, an oscillating valve adapted to establish communication between passages in said shaft and a source of fluid under presssure and then with an exhaust means, and means for operating said valve in synchronism with the rotation of the central shaft so that the flow of fluid through said valve is intermittent and rapidly alternate in opposite directions.

5. In a filtering apparatus, a solution tank, a hollow rotatable shaft, filter leaves mounted on said shaft and adapted to rotate into and out of said solution, said leaves being formed in sections each having its interior connected with a passage in the shaft, and means to produce an intermittent pulsation of fluid within the sections of the respective filter leaves during a period when they are above the surface of the solution.

6. The method of discharging caked material from the surfaces of the leaves of rotary filters without interrupting the operation of the filters which comprises alternately and rapidly inflating and deflating the filter leaf by varying the pressure of a fluid medium within the filter leaf.

7. The method of discharging caked material from the filtering surfaces of a continuous filter without interrupting the operation of the filter which comprises producing a series of rapid pulsations in the fabric of the filtering surface, adjacent the point of cake discharge.

8. In a filtering apparatus, a hollow rotatable shaft, inflatable filter leaves mounted on said shaft, said leaves being formed in sections each having its interior connecting with a passage in the shaft, means to produce intermittent inflation and deflation of the filter leaf sections while they are in a predetermined position in their rotation to discharge the filter cake, and deflecting means cooperating with said first mentioned means to deflect the cake from the filter leaves away from the solution tanks.

In testimony whereof I have affixed my signature to this specification.

JASPER A. McCASKELL.